United States Patent [19]
Komeichi

[11] Patent Number: 5,929,871
[45] Date of Patent: Jul. 27, 1999

[54] ACCESS CONTROL APPARATUS AND IMAGE PROCESSING SYSTEM

[75] Inventor: Masatoshi Komeichi, Kawasaki, Japan

[73] Assignee: Fujitsu Limited, Kawasaki, Japan

[21] Appl. No.: 08/843,442

[22] Filed: Apr. 16, 1997

[30] Foreign Application Priority Data

Sep. 5, 1996 [JP] Japan .................................. 8-235507

[51] Int. Cl.⁶ ............................................. G06F 13/16
[52] U.S. Cl. ........................................... 345/521; 345/508
[58] Field of Search .................................. 345/508, 521, 345/515, 516; 711/5, 100, 157, 173

[56] References Cited

U.S. PATENT DOCUMENTS

| | | | |
|---|---|---|---|
| 4,912,771 | 3/1990 | Komine et al. | 382/296 |
| 5,404,448 | 4/1995 | Bowen et al. | 345/508 |
| 5,587,726 | 12/1996 | Moffat | 345/508 |
| 5,757,364 | 5/1998 | Ozawa et al. | 345/508 |

FOREIGN PATENT DOCUMENTS 2 289 199  11/1995  United Kingdom .............. G06T 1/60

*Primary Examiner*—Kee M. Tung
*Attorney, Agent, or Firm*—Staas & Halsey

[57] ABSTRACT

An access control apparatus controls access to a frame buffer part including first, second and third memory blocks storing image data. The access control apparatus includes a storage buffer storing a selection value which indicates one of sides A and B each amounting to one frame of image data to be stored in the frame buffer part, and an access control circuit part generating control signals in response to the selection value read from the storage buffer. The control signals specify the first memory block and a first half of the second memory block when the selection value indicates the side A, and specify a second half of the second memory block and the third memory block when the selection value indicates the side B, so that a double buffer structure is formed by the first through third memory blocks.

12 Claims, 15 Drawing Sheets

FIG. 4A
PRIOR ART

SIDE A

| 45-1 RAS0 SE0[0]/SC0 CAS0/1 OE0/WE0 RD00-15 SD00-15 | CAS2/3 OE0/WE0 RD16-31 SD16-31 45-2 | 45-3 BANK0 SE0[1]/SC0 CAS4/5 OE0/WE0 RD32-47 SD32-47 | CAS6/7 OE0/WE0 RD48-63 SD48-63 45-4 | 45-5 RAS0 SE0[2]/SC0 CAS0/1 OE1/WE1 RD00-15 SD64-79 | CAS2/3 OE1/WE1 RD16-31 SD80-95 45-6 | 45-7 BANK1 SE0[3]/SC0 CAS4/5 OE1/WE1 RD32-47 SD96-111 | CAS6/7 OE1/WE1 RD48-63 SD112-127 45-8 |

SIDE A

| 45-9 RAS0 SE1[0]/SC1 CAS0/1 OE2/WE2 RD00-15 SD00-15 | CAS2/3 OE2/WE2 RD16-31 SD16-31 45-10 | 45-11 BANK0 SE1[1]/SC1 CAS4/5 OE2/WE2 RD32-47 SD32-47 | CAS6/7 OE2/WE2 RD48-63 SD48-63 45-12 | 45-13 RAS0 SE1[2]/SC1 CAS0/1 OE3/WE3 RD00-15 SD64-79 | CAS2/3 OE3/WE3 RD16-31 SD80-95 45-14 | 45-15 BANK1 SE1[3]/SC1 CAS4/5 OE3/WE3 RD32-47 SD96-111 | CAS6/7 OE3/WE3 RD48-63 SD112-127 45-16 |

FIG. 4B
PRIOR ART

SIDE B

| 46-1 RAS1 SE2[0]/SC2 CAS0/1 OE0/WE0 RD00-15 SD00-15 | CAS2/3 OE0/WE0 RD16-31 SD16-31 46-2 | 46-3 BANK0 SE2[1]/SC2 CAS4/5 OE0/WE0 RD32-47 SD32-47 | CAS6/7 OE0/WE0 RD48-63 SD48-63 46-4 | 46-5 RAS1 SE2[2]/SC2 CAS0/1 OE1/WE1 RD00-15 SD64-79 | CAS2/3 OE1/WE1 RD16-31 SD80-95 46-6 | 46-7 BANK1 SE2[3]/SC2 CAS4/5 OE1/WE1 RD32-47 SD96-111 | CAS6/7 OE1/WE1 RD48-63 SD112-127 46-8 |

SIDE B

| 46-9 RAS1 SE3[0]/SC2 CAS0/1 OE2/WE2 RD00-15 SD00-15 | CAS2/3 OE2/WE2 RD16-31 SD16-31 46-10 | 46-11 BANK0 SE3[1]/SC2 CAS4/5 OE2/WE2 RD32-47 SD32-47 | CAS6/7 OE2/WE2 RD48-63 SD48-63 46-12 | 46-13 RAS1 SE3[2]/SC2 CAS0/1 OE3/WE3 RD00-15 SD64-79 | CAS2/3 OE3/WE3 RD16-31 SD80-95 46-14 | 46-15 BANK1 SE2[3]/SC2 CAS4/5 OE3/WE3 RD32-47 SD96-111 | CAS6/7 OE3/WE3 RD48-63 SD112-127 46-16 |

F I G. 7
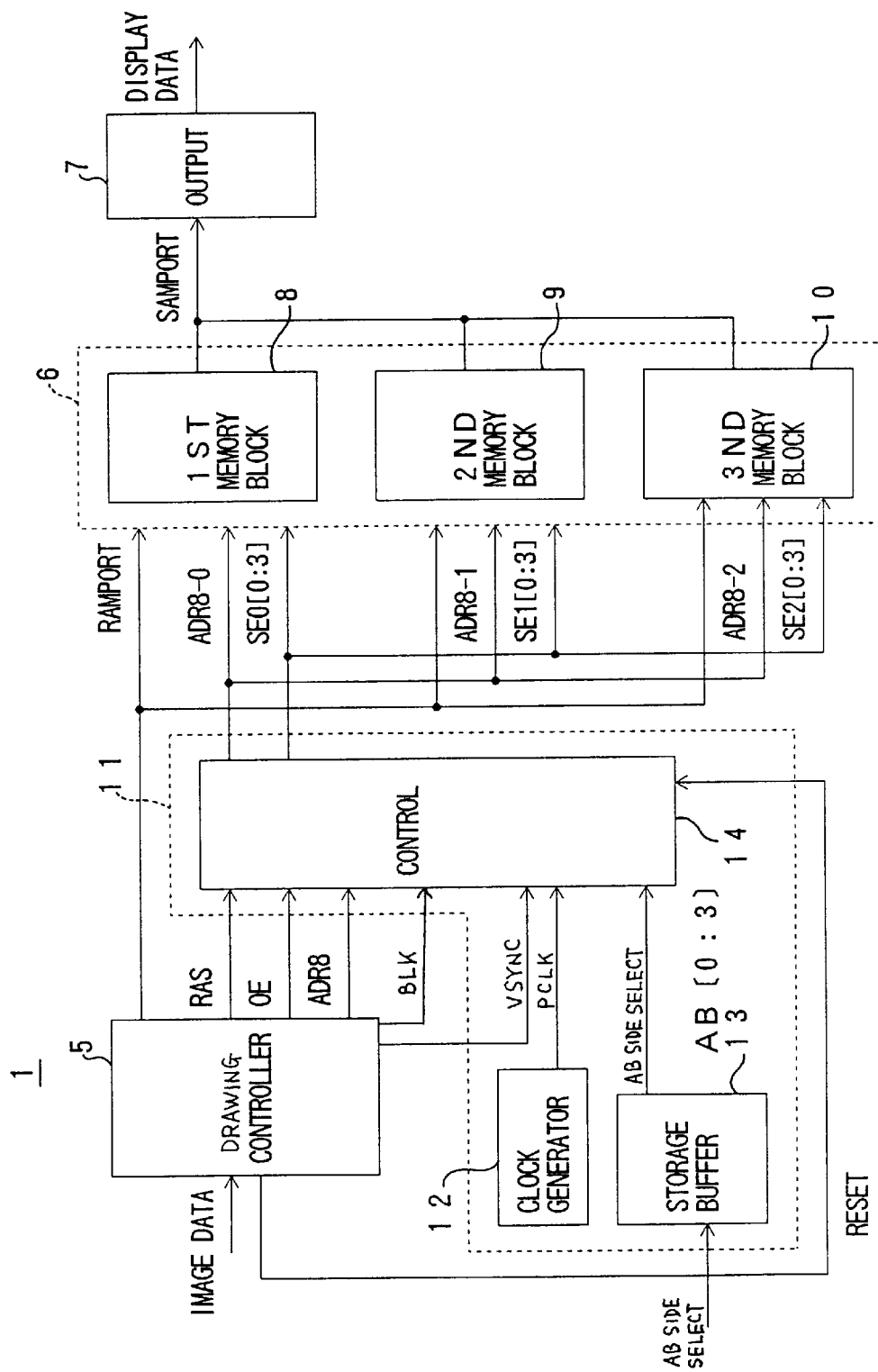

FIG. 9

|  |  |  | ADR8 | UPPER 2 BITS OF DISPLAYING PIXEL ADDRESS Q[20:19] |
|---|---|---|---|---|
| SIDE A | A 0 | 1ST MEMORY BLOCK 8 | 0 | 00 |
| SIDE A | A 1 | 1ST MEMORY BLOCK 8 | 1 | 01 |
|  | A 2 | 2ND MEMORY BLOCK 9 | 0 | 10 |
|  | B 0 | 2ND MEMORY BLOCK 9 | 1 | 00 |
| SIDE B | B 1 | 3RD MEMORY BLOCK 10 | 0 | 01 |
| SIDE B | B 2 | 3RD MEMORY BLOCK 10 | 1 | 10 |

F I G. 1 3

| DISPLAY REGION | | Q[20:19] | 1ST MEMORY BLOCK 8 ADR8-0 | 2ND MEMORY BLOCK 9 ADR8-1 | 3RD MEMORY BLOCK 10 ADR8-2 |
|---|---|---|---|---|---|
| A0 | B0 | 00 | 0 | 1 | 1 |
| A1 | B1 | 01 | 1 | 1 | 0 |
| A2 | B2 | 10 | 0 | 0 | 1 |

ACCESS CONTROL APPARATUS AND IMAGE PROCESSING SYSTEM

BACKGROUND OF THE INVENTION

FIELD OF THE INVENTION

The present invention generally relates to access control apparatuses and image processing systems, and more particularly to an access control apparatus which is suited for use in an image processing system which employs video random access memories (VRAMs) to draw graphics, and also to the image processing system such as a graphics accelerator.

STATE OF THE RELATED ART

When displaying characters and images on a display in an image processing system, a host processor or a drawing processor first develops the characters and images in a frame buffer. Then, contents of the frame buffer are read and displayed on the display. Such a technique is most popularly used when displaying graphics.

The frame buffer which stores developed data of the characters and images is made up of a plurality of memories. On the other hand, the memory capacity of each memory is predetermined, and it is not always the case that the frame buffer is made up of memories amounting to a total memory capacity which is appropriate when taking into consideration the frame size, the displaying colors and the like. In other words, the frame buffer is in most cases made up of memories amounting to a total memory capacity which is larger than a memory capacity that is actually required.

For this reason, there are demands to realize an access control apparatus which can form the frame buffer from a minimum necessary number of memories such that the total memory capacity is sufficiently large but not too large in order to avoid waste of memory capacity.

FIG. 1 is a system block diagram generally showing an example of a conventional image processing system. In FIG. 1, an access control apparatus 31 is coupled to a bus 33 of a host processor 32. A central processing unit (CPU) 32a, a memory 32b and the like which form the host processor 32 are coupled to the bus 33. Three-dimensional image data processed by the CPU 32a are supplied to the access control apparatus 31 via the bus 33, and the access control apparatus 31 develops the image data at a high speed and supplies the developed image data to a display unit 34.

FIG. 2 is a system block diagram showing an example of a conventional access control apparatus. The access control apparatus 31 shown in FIG. 2 includes a drawing controller 35 which mainly develops the image data supplied from the host processor 32 via the bus 33, a frame buffer part 36 which stores display data developed by the drawing controller 35, and an output circuit 37 which outputs the display data stored in the frame buffer part 36 to the display unit 34. The output circuit 37 may include a RAM table and a digital-to-analog converter (DAC).

The frame buffer part 36 has a so-called double buffer construction and includes first and second frame buffers 38 and 39 respectively for storing the display data amounting to 1 frame. In other words, the display data of sides A and B amounting to 2 frames can be stored by the first and second frame buffers 38 and 39. The frame buffer part 36 also includes an inverter circuit 40. If it is assumed for the sake of convenience that 1 frame has a width of 1280 pixels and a height of 1024 pixels and is described in 32 bits/pixel in full color, a memory capacity required to store 1 frame becomes as follows.

1280×1024×32=1.25 Mpixels=5 Mbytes

Accordingly, a memory capacity required to store 2 frames becomes as follows.

1.25 Mpixels×2=2.5 Mpixels=10 Mbytes

Therefore, the first and second frame buffers 38 and 39 must have a relatively large memory capacity, and for this reason, each frame buffer is normally made up of a plurality of VRAMs.

FIG. 3 is a system block diagram showing the construction of the VRAM. A VRAM 41 shown in FIG. 3 is made up of a dynamic random access memory (DRAM) which is provided with a serial access memory (SAM) port Psam. Data input to memory cells 42 are made via a random access memory (RAM) port Pram, similarly to the DRAM.

If it is assumed for the sake of convenience that the address has 8 bits, the data has 16 bits and the memory capacity of the VRAM 41 is 4 Mbits, an access can be made to 512×512 memory cells 42 via the RAM port Pram to store the data in the memory cells 42. The data stored in the memory cells 42 are serially transferred to a serial data register 43 by a split transfer and stored in the serial data register 43, before being output from the SAM port Psam via a buffer 44 as serial data.

The buffer 44 is enabled in response to a serial enable signal SE which is supplied to a serial enable signal terminal SE, and the output of the serial data is controlled by this buffer 44.

In FIG. 3, RAS denotes a row address strobe signal, CAS denotes a column address strobe signal, OE denotes an output enable signal, WE denotes a write enable signal, DSF denotes a special function select signal, QSF denotes a special function output signal, SC denotes a serial clock signal, and SE denotes a serial enable signal.

FIGS. 4A and 4B respectively are diagrams for explaining an example of the connections of the VRAMs of the frame buffer part. FIG. 4A shows the connections of the VRAMs forming the first frame buffer 38, and FIG. 4B shows the connections of the VRAMs forming the second frame buffer 39.

As shown in FIG. 4A, terminals RD0 through RD63 of 4 VRAMs 45-1 through 45-4 and 4 VRAMs 45-5 through 45-8 correspond to the 64-bit data width of the RAM port of the first frame buffer 38. In addition, terminals SD0 through SD127 of 8 VRAMs 45-1 through 45-8 correspond to the 128-bit data width of the SAM port of the first frame buffer 38.

Similarly, the terminals RD0 through RD63 of 4 VRAMs 45-9 through 45-12 and 4 VRAMs 45-13 through 45-16 correspond to the 64-bit data width of the RAM port of the first frame buffer 38. In addition, the terminals SD0 through SD127 of 8 VRAMs 45-9 through 45-16 correspond to the 128-bit data width of the SAM port of the first frame buffer 38.

Further, as shown in FIG. 4B, terminals RD0 through RD63 of 4 VRAMs 46-1 through 46-4 and 4 VRAMs 46-5 through 46-8 correspond to the 64-bit data width of the RAM port of the second frame buffer 39. In addition, terminals SD0 through SD127 of 8 VRAMs 46-1 through 46-8 correspond to the 128-bit data width of the SAM port of the second frame buffer 39.

Similarly, the terminals RD0 through RD63 of 4 VRAMs 46-9 through 46-12 and 4 VRAMs 46-13 through 46-16 correspond to the 64-bit data width of the RAM port of the second frame buffer 39. In addition, the terminals SD0 through SD127 of 8 VRAMs 46-9 through 46-16 correspond to the 128-bit data width of the SAM port of the second frame buffer 39.

Accordingly, if 1 frame has a width of 1280 pixels and a height of 1024 pixels and is described in 32 bits/pixel in full color, a memory capacity required to store 1 frame becomes 1280×1024×32=1.25 Mpixels=5 Mbytes. If the memory capacity can only be increased in units of 1 Mpixels in this case, it becomes necessary to provide a memory capacity of 2 Mpixels (10 Mbytes) in order to store 1 frame. Consequently, 16 4 Mbit-VRAMs become necessary to provide the memory capacity of 2 Mpixels.

The first frame buffer 38 receives an AB side selection value AB[0:3] for selecting which one of sides A and B of the frame is to be output. The side A is selected when the AB side selection value is "1", and the side B is selected when the AB side selection value is "0".

The AB side selection value is supplied as it is to the first frame buffer 38 which stores the side A of the frame, as a serial enable signal which enables the SAM port for outputting the display data. On the other hand, the AB side selection value is inverted by the inverter circuit 40 and supplied to the second frame buffer 39 which stores the side B of the frame, as a serial enable signal which enables the SAM port for outputting the display data. For this reason, when the AB side selection value is "1" and selects the side A, the serial enable signal to the first frame buffer 38 becomes "1" and the serial enable signal to the second frame buffer 39 becomes "0". Hence, in this case, the first frame buffer 38 is selected and the display data of the side A is supplied to the output circuit 37. If the AB side selection value is "0" and selects the side B, the serial enable signal to the first frame buffer 38 is "0" and the serial enable signal to the second frame buffer 39 is "1". Thus, in this latter case, the second frame buffer 39 is selected and the display data of the side B is supplied to the output circuit 37.

FIG. 5 is a diagram for explaining the operation of the frame buffer part. According to the frame buffer part 36, the first frame buffer 38 and he second frame buffer 39 have the same memory structure as shown in FIGS. 4A and 4B, and an access is made to the same position within each frame buffer in response to a transfer address supplied from the drawing controller 35. In other words, if a most significant bit (MSB) of the transfer address is "0" as shown in FIG. 5, the access is made to a first storage region 38-1 within the first frame buffer 38 and to a first storage region 39-1 within the second frame buffer 39. On the other hand, if the MSB of the transfer address is "1", the access is made to a second storage region 38-2 within the first frame buffer 38 and to a second storage region 39-2 within the second frame buffer 39.

The frame size generally used in the existing work stations and the like has a width of 1280 pixels and a height of 1024 pixels, and the data processed is 32 bits/pixel, for example. Hence, as explained above, it requires a memory capacity of 1280×1024×32×2=10 Mbytes (2.5 Mpixels) to store 2 frames. However, when sixteen (16) 4 Mbit-VRAMs are used to store 1 frame, the memory capacity provided by the thirty-two (32) (=16×2) 4 Mbit-VRAMs is 4×1024×1024×16×2=16 Mbytes (4 Mpixels). Therefore, the memory capacity that is actually required to store 1 frame is only approximately ¾ the memory capacity of the frame buffer part which is formed by the thirty-two (32) 4 Mbit-VRAMs, and there was a problem in that the memory capacity amounting to eight (8) 4 Mbit-VRAMs is unused.

SUMMARY OF THE INVENTION

Accordingly, it is a general object of the present invention to provide a novel and useful access control apparatus and image processing system in which the problem described above is eliminated.

Another and more specific object of the present invention is to provide an access control apparatus and an image processing system which can minimize the number of memories used.

Still another object of the present invention is to provide an access control apparatus which controls access to a frame buffer part including first, second and third memory blocks storing image data, comprising a storage buffer storing a selection value which indicates one of sides A and B each amounting to one frame of image data to be stored in the frame buffer part, and an access control circuit part generating control signals in response to the selection value read from the storage buffer, where the control signals specify the first memory block and a first half of the second memory block when the selection value indicates the side A, and specify a second half of the second memory block and the third memory block when the selection value indicates the side B, so that a double buffer structure is formed by the first through third memory blocks. According to the access control apparatus of the present invention, it is possible to improve the utilization efficiency of the memory capacity provided by memories forming the frame buffer part, using a relatively simple circuit.

A further object of the present invention is to provide an image processing system comprising a frame buffer part including first, second and third memory blocks storing image data, a storage buffer storing a selection value which indicates one of sides A and B each amounting to one frame of image data to be stored in the frame buffer part, and an access control circuit part generating control signals in response to the selection value read from the storage buffer, where the control signals specify the first emory block and a first half of the second memory block when the selection value indicates the side A, and specify a second half of the second memory block and the third memory block when the selection value indicates the side B, so that a double buffer structure is formed by the first through third memory blocks. According to the image processing system of the present invention, it is possible to improve the utilization efficiency of the memory capacity provided by memories forming the frame buffer part, using a relatively simple circuit. Hence, it is possible to improve the memory utilization efficiency of the image processing system by making a simple modification of an existing system, that is, by adding a relatively simple circuit, without having to greatly modify the entire system.

Another object of the present invention is to provide an image processing system comprising first storage means, having a first storage region and a second storage region divided depending on a transfer address, and selected in response to a selection signal, for outputting image data from a storage position dependent on the transfer address, second storage means, having a third storage region and a fourth storage region divided depending on a transfer address, and selected in response to a selection signal, for outputting image data from a storage position dependent on the transfer address, third storage means, having a fifth storage region and a sixth storage region divided depending on a transfer address, and selected in response to a selection signal, for outputting image data from a storage position dependent on the transfer address, and control means for controlling the transfer addresses supplied to the first, second and third storage means so that each pair of storage regions formed by the first and fourth storage regions, the second and fifth storage regions, and the third and sixth storage regions are accessed simultaneously, and for controlling the selection signals so that one of first and second region groups are selected, where the first region group includes the first, second and third storage regions, and the second region group includes the fourth, fifth and sixth storage regions. According to the image processing system of the present invention, it is possible to improve the utilization efficiency of the memory capacity provided by memories forming the first through third memory means, using a relatively simple circuit. Hence, it is possible to improve the memory utilization efficiency of the image processing system by making a simple modification of an existing system, that is, by adding a relatively simple circuit, without having to greatly modify the entire system.

Other objects and further features of the present invention will be apparent from the following detailed description when read in conjunction with the accompanying drawings.

BRIEF DESCRIPTION OF THE DRAWINGS

FIGS. 4A and 4B respectively are diagrams for explaining an example of the connections of the VRAMs of a frame buffer part;

FIG. 7 is a system block diagram showing an embodiment of an access control apparatus;

FIG. 9 is a diagram for explaining the arrangement of storage regions of the frame buffer part;

FIG. 13 is a diagram showing the relationship of a displaying pixel counted value and the transfer addresses with respect to a display region;

DESCRIPTION OF THE PREFERRED EMBODIMENTS

Figure 1:
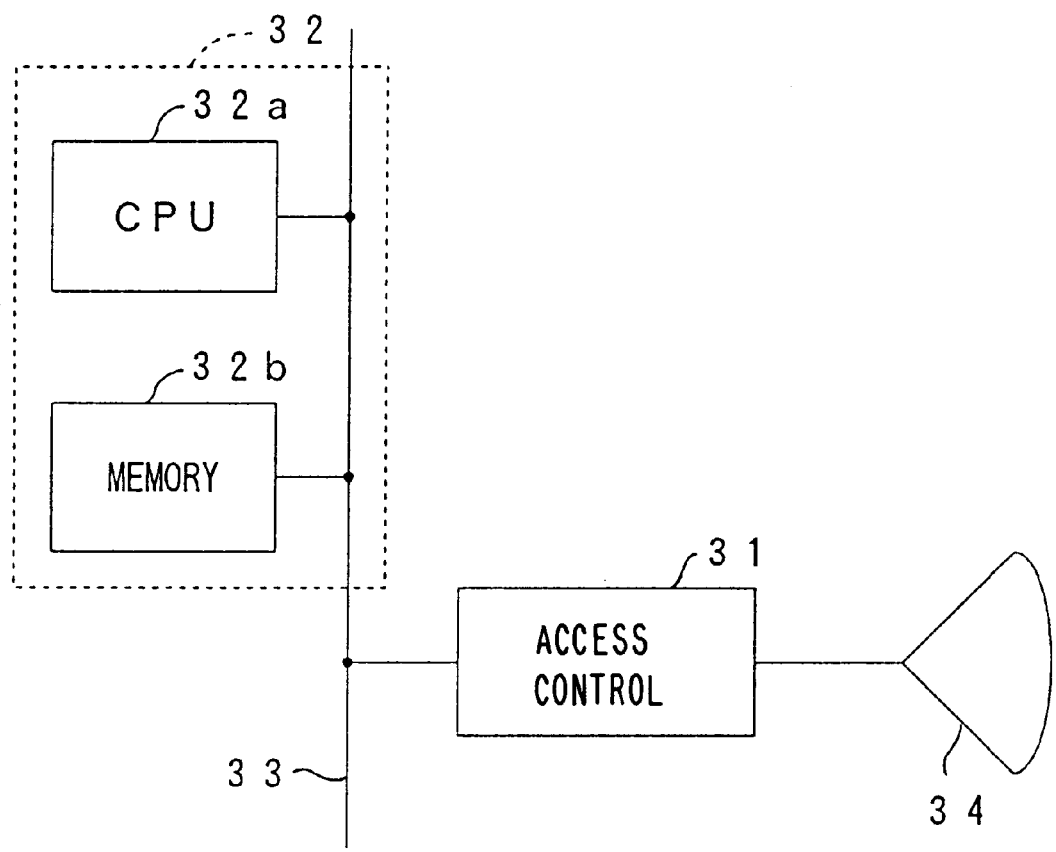
FIG. 1 is a system block diagram generally showing an example of a conventional image processing system.
Figure 2:
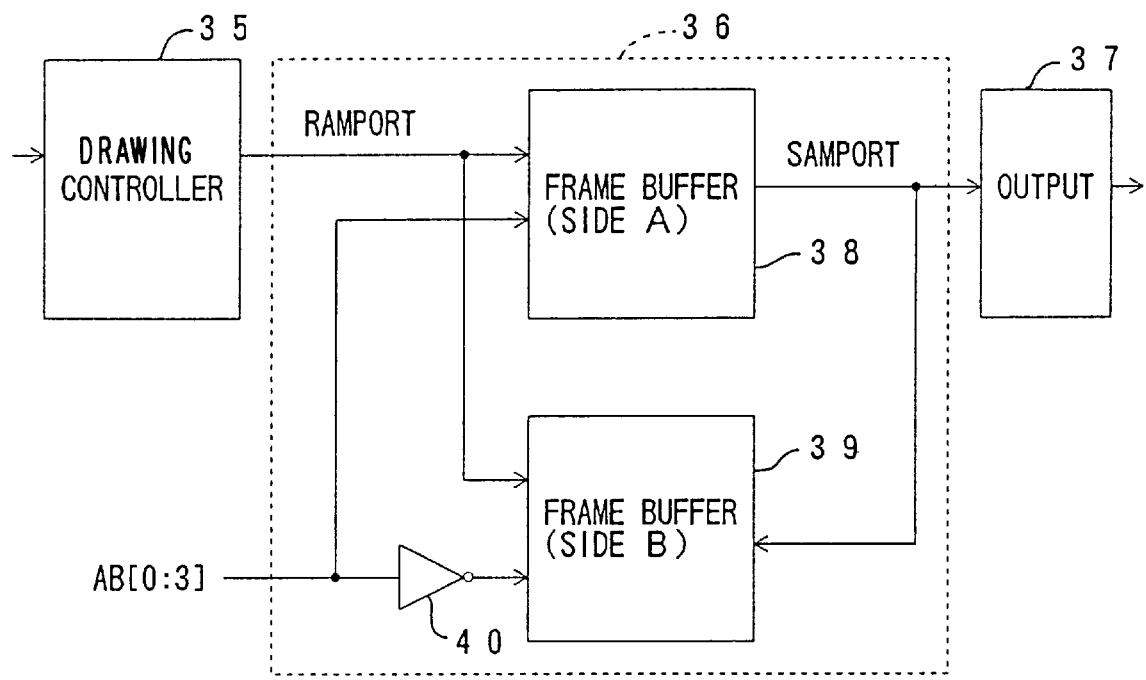
FIG. 2 is a system block diagram showing an example of a conventional access control apparatus.
Figure 3:
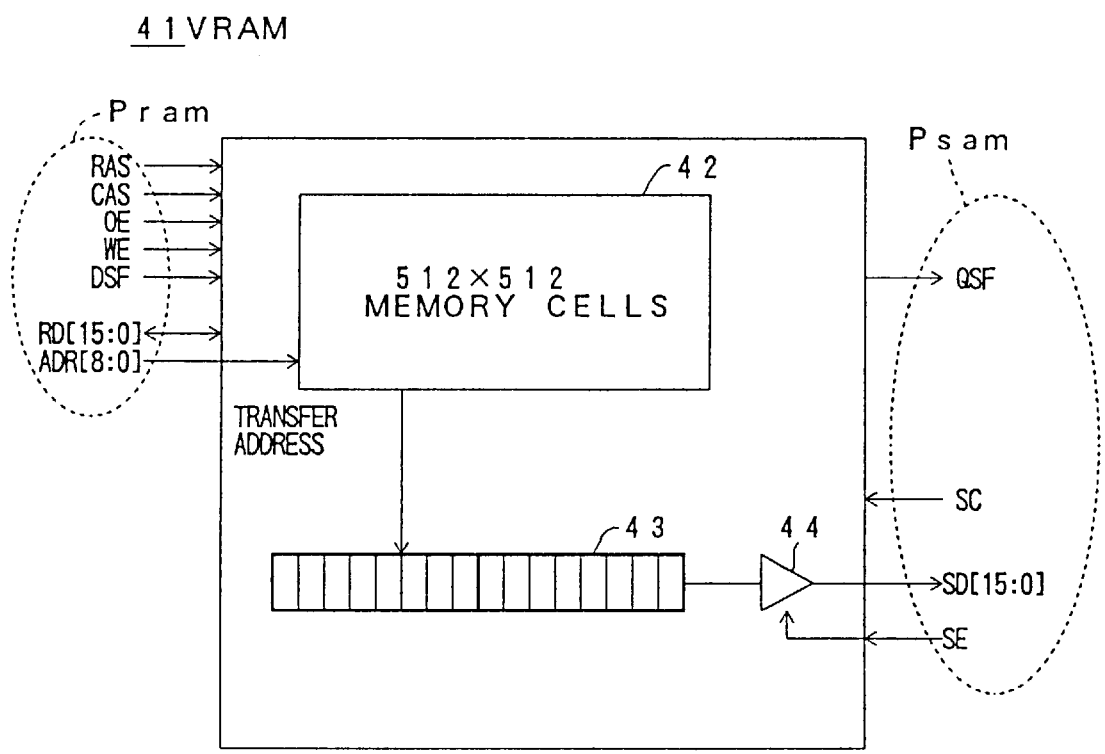
FIG. 3 is a system block diagram showing the construction of a VRAM.
Figure 5:
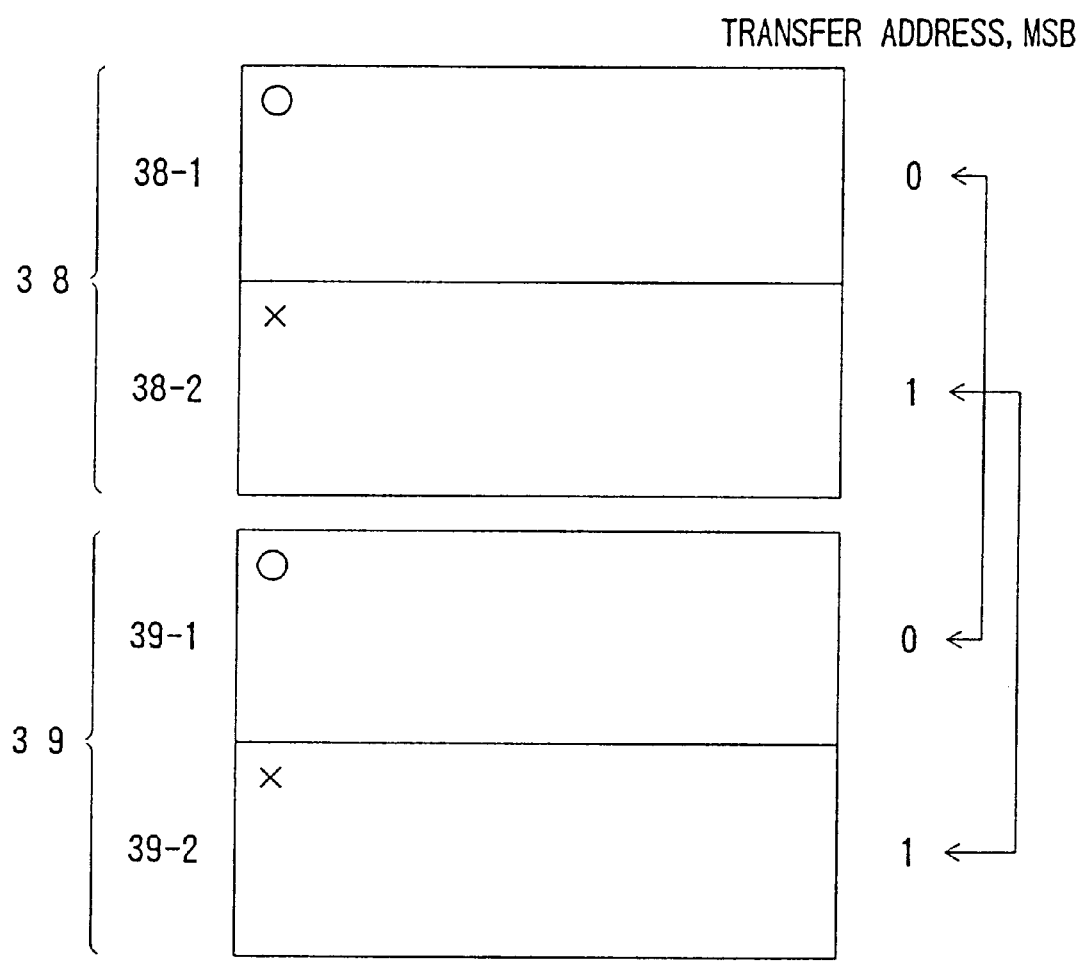
FIG. 5 is a diagram for explaining the operation of the frame buffer part.
Figure 6:
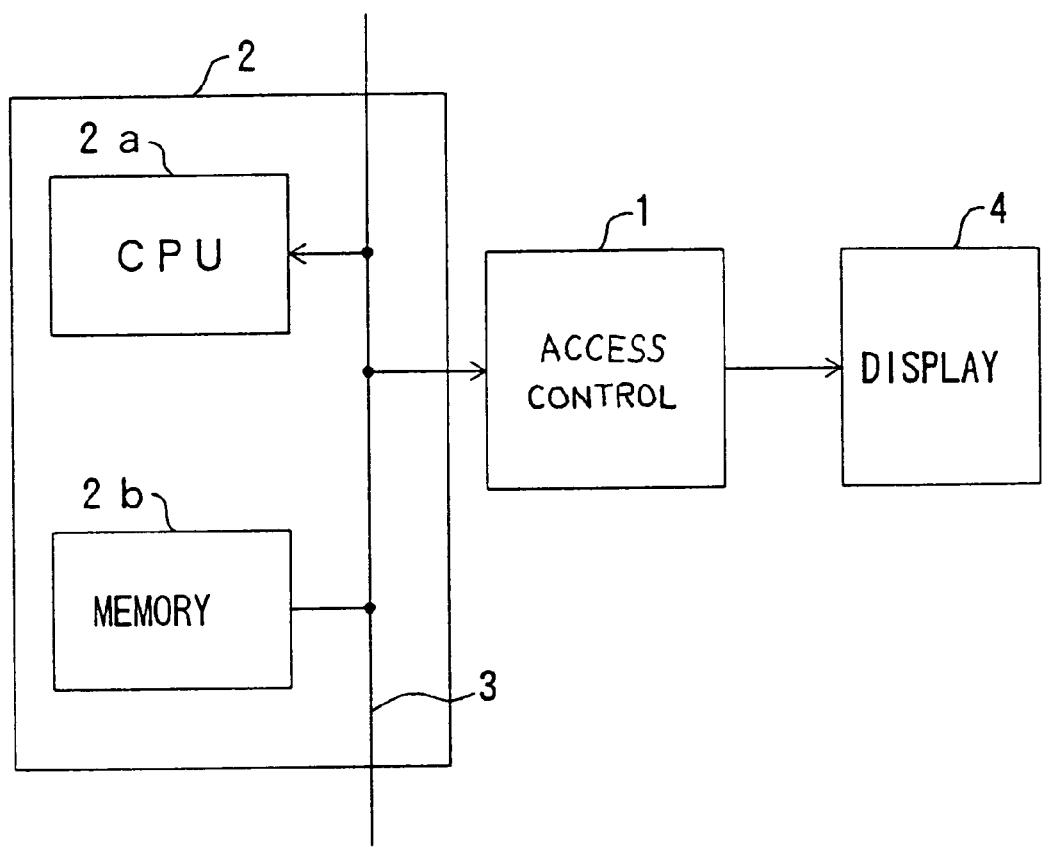
FIG. 6 is a system block diagram showing an embodiment of an image processing system according to the present invention.

FIG. 6 shows an embodiment of an image processing system according to the present invention. This embodiment of the image processing system employs an embodiment of an access control apparatus according to the present invention. In FIG. 6, an access control apparatus 1 is coupled to a bus 3 of a host processor 2. This access control apparatus 1 develops image data supplied from the host processor 2 via the bus 3, at a high speed, and supplies the developed image data to a display unit 4. The host processor 2 includes a CPU 2a and a memory 2b which are coupled to the bus 3.

FIG. 7 shows an embodiment of the access control apparatus. The access control apparatus 1 shown in FIG. 7 includes a drawing controller 5 which develops the image data supplied from the host processor 2, a frame buffer part 6 which stores the display data developed by the drawing controller 5 in units of frames and amounting to 2 frames, and an output circuit 7 which outputs the display data stored in the frame buffer part 6 to the display unit 4, and an access control circuit part 11. The output circuit 7 may include a RAM table and a DAC.

For example, the drawing controller 5 is made up of a graphics IC chip GLINT300SX manufactured by 3Dlabs, and the drawing controller 5 is coupled to the host processor 2 via the bus 3. The drawing controller 5 develops the image data supplied from the host processor 2 via the bus 3.

The image data developed by the drawing controller 5, that is, the display data, are temporarily stored in the frame buffer part 6. The frame buffer part 6 includes first through third memory blocks 8 through 10. The first memory block 8 stores a portion of the display data of side A. The third memory block 10 stores a portion of the display data of side B. In addition, the second memory block 9 has 2 storage regions and is provided with respect to both the sides A and B. More particularly, the second memory block 9 stores a remaining portion of the display data of the side A in one storage region thereof, and stores a remaining portion of the display data of the side B in the other storage region thereof. The access control circuit part 11 controls transfer addresses and output enable signals which are supplied to the first through third memory blocks 8 through 10 when reading the display data, depending on a transfer address and an AB side selection value which are supplied from the drawing controller 5, so that a synthesized frame of the sides A and B is read from the frame buffer part 6. The access control circuit part 11 may be provided independently of the frame buffer part 6 as shown in FIG. 7 or, provided within the frame buffer part 6 as a portion thereof.

The first through third memory blocks 8 through 10 has the so-called double-buffer structure, so that 2 frames can be stored. For example, if 1 frame has the size of 1280×1024 pixels and the image data have 32 bits/pixel, the first through third memory blocks 8 through 10 can be formed by 24 4 Mbit-VRAMs. For example, a VRAM TMS55160 manufactured by Texas Instruments may be used as the VRAMs forming the first through fourth memory blocks 8 through 10.

The VRAMs forming the first through third memory blocks 8 through 10 are arranged so that the data width of the RAM ports is 64 bits, and the data with of the SAM ports is 128 bits.

Figure 8:
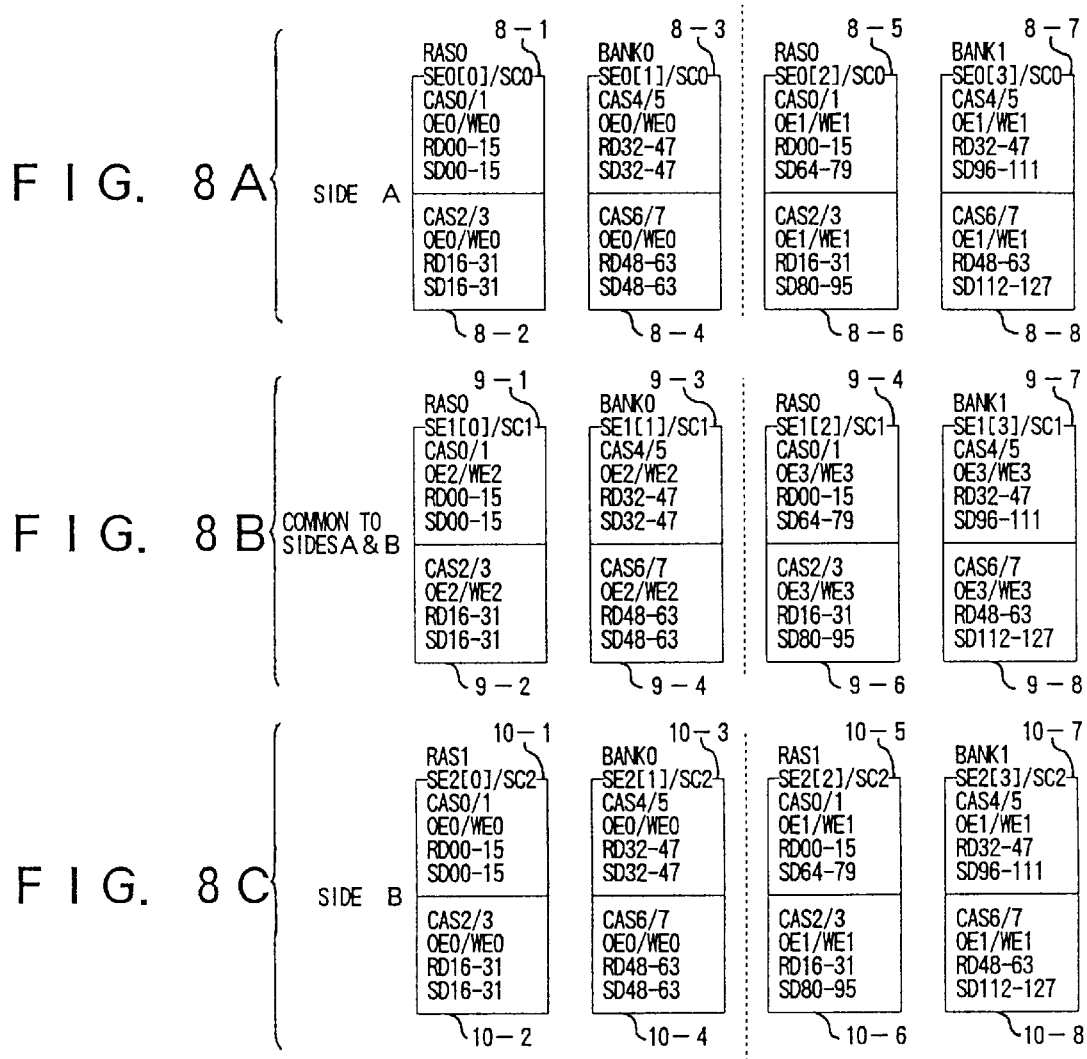
FIGS. 8A, 8B and 8C respectively are diagrams for explaining the connections of VRAMS of a frame buffer part.

FIGS. 8A through 8C respectively are diagrams for explaining the connections of the VRAMs of the frame buffer part 6 in this embodiment. FIG. 8A shows the connections of the VRAMs forming the first memory block 8, FIG. 8B shows the connections of the VRAMs forming the second memory block 9, and FIG. 8C shows the connections of the VRAMs forming the third memory block 10.

As shown in FIG. 8A, the first memory block 8 is made up of 8 VRAMs 8-1 through 8-8. The RAM port of the first memory block 8 has a data width of 64 bits, and is formed by terminals RD0 through RD63 of the 4 VRAMs 8-1 through 8-4 and the 4 VRAMs 8-5 through 8-8. The SAM port of the first memory block 8 has a data width of 128 bits, and is formed by terminals SD0 through SD128 of the 8 VRAMs 8-1 through 8-8.

The 16-bit RAM ports of the 4 VRAMs 8-1 through 8-4 which form a bank BANK0 are arranged in parallel to form 16×4=64 bits, and the 16-bit RAM ports of the 4 VRAMs 8-5 through 8-8 which form a bank BANK1 are arranged in parallel to form 16×4=64 bits, thereby forming the 64-bit RAM port of the first memory block 8. Hence, the 64-bit RAM port of the first memory block 8 is made up of 2 bank systems. The banks BANK0 and BANK1 are identified by corresponding write enable signals WE0 and WE1, and the display data are written to the first memory block 8 in units of 64 bits.

In addition, the 128-bit SAM port of the first memory block 8 is realized by connecting the 16-bit SAM ports of the 8 VRAMs 8-1 through 8-8 to obtain 16×8=128 bits. The outputs from the SAM ports of the 8 VRAMs 8-1 through 8-8 are selected by a 4-bit first serial enable signal SE0 which is supplied to the first memory block 8.

Out of the 4-bit first serial enable signal SE0 which is supplied to the first memory block 8, the first bit is supplied serial enable terminals of the VRAMs which output serial data SD0 through SD15 and SD16 through SD31, and the second bit is supplied to serial enable terminals of the VRAMs which output serial data SD32 through SD47 and SD48 through SD63. In addition, the third bit is supplied to serial enable terminals of the VRAMs which output serial data SD64 through SD79 and SD80 through SD95, and the fourth bit is supplied to serial enable terminals of the VRAMs which output serial data SD96 through SD111 and SD112 through SD127.

As shown in FIG. 8B, the second memory block 9 is made up of 8 VRAMs 9-1 through 9-8. SAM ports of the 2 VRAMs 9-1 and 9-2 are selected by the same second serial enable signal SE1 [0], and SAM ports of the 2 VRAMs 9-3 and 9-4 are selected by the same second serial enable signal SE1 [1]. The display data are output via the serial ports of the VRAMs 9-1 through 9-4.

Similarly, SAM ports of the 2 VRAMs 9-5 and 9-6 are selected by the same second serial enable signal SE1 [2], and SAM ports of the 2 VRAMs 9-7 and 9-8 are selected by the same second serial enable signal SE1 [3]. The display data are output via the serial ports of the VRAMs 9-5 through 9-8.

The 16-bit RAM ports of the 4 VRAMs 9-1 through 9-4 which form the bank BANK0 are arranged in parallel to form 16×4=64 bits, and the 16-bit RAM ports of the 4 VRAMs 9-5 through 9-8 which form the bank BANK1 are arranged in parallel to form 16×4=64 bits, thereby forming the 64-bit RAM port of the second memory block 9. Hence, the 64-bit RAM port of the second memory block 9 is made up of 2 bank systems. The banks BANK0 and BANK1 are identified by corresponding write enable signals WE2 and WE3, and the display data are written to the second memory block 9 in units of 64 bits.

In addition, the 128-bit SAM port of the second memory block 9 is realized by connecting the 16-bit SAM ports of the 8 VRAMs 9-1 through 9-8 to obtain 16×8=128 bits. The outputs from the SAM ports of the 8 VRAMs 9-1 through 9-8 are selected by the 4-bit second serial enable signal SE1 which is supplied to the second memory block 9.

Out of the 4-bit second serial enable signal SE1 which is supplied to the second memory block 9, the first bit is supplied serial enable terminals of the VRAMs which output serial data SD0 through SD15 and SD16 through SD31, and the second bit is supplied to serial enable terminals of the VRAMs which output serial data SD32 through SD47 and SD48 through SD63. In addition, the third bit is supplied to serial enable terminals of the VRAMs which output serial data SD64 through SD79 and SD80 through SD95, and the fourth bit is supplied to serial enable terminals of the VRAMs which output serial data SD96 through SD11 and SD112 through SD127.

As shown in FIG. 8C, the third memory block is made up of 8 VRAMs 10-1 through 10-8. SAM ports of the 2 VRAMs 10-1 and 10-2 are selected by the same third serial enable signal SE2 [0], and SAM ports of the 2 VRAMs 10-3 and 10-4 are selected by the same third serial enable signal SE2 [1]. The display data are output via the serial ports of the VRAMs 10-1 through 10-4.

Similarly, SAM ports of the 2 VRAMs 10-5 and 10-6 are selected by the same third serial enable signal SE2 [2], and SAM ports of the 2 VRAMs 10-7 and 10-8 are selected by the same third serial enable signal SE2 [3]. The display data are output via the serial ports of the VRAMs 10-5 through 10-8.

The 16-bit RAM ports of the 4 VRAMs 10-1 through 10-4 which form the bank BANK0 are arranged in parallel to form 16×4=64 bits, and the 16-bit RAM ports of the 4 VRAMs 10-5 through 10-8 which form the bank BANK1 are arranged in parallel to form 16×4=64 bits, thereby forming the 64-bit RAM port of the third memory block 10. Hence, the 64-bit RAM port of the third memory block 10 is made up of 2 bank systems. The banks BANK0 and BANK1 are identified by corresponding write enable signals WE0 and WE1, and the display data are written to the third memory block in units of 64 bits.

In addition, the 128-bit SAM port of the third memory block 10 is realized by connecting the 16-bit SAM ports of the 8 VRAMs 10-1 through 10-8 to obtain 16×8=128 bits. The outputs from the SAM ports of the 8 VRAMs 10-1 through 10-8 are selected by the 4-bit third serial enable signal SE2 which is supplied to the third memory block 10.

Out of the 4-bit third serial enable signal SE2 which is supplied to the third memory block 10, the first bit is supplied serial enable terminals of the VRAMs which output serial data SD0 through SD15 and SD16 through SD31, and the second bit is supplied to serial enable terminals of the VRAMs which output serial data SD32 through SD47 and SD48 through SD63. In addition, the third bit is supplied to serial enable terminals of the VRAMs which output serial data SD64 through SD79 and SD80 through SD95, and the fourth bit is supplied to serial enable terminals of the VRAMs which output serial data SD96 through SD111 and SD112 through SD127.

The transfer address ADR and the first, second and third serial enable signals SE0 [0:3], SE1 [0:3] and SE2 [0:3] which are supplied to the first through third memory blocks 8 through 10 of the frame buffer part 6 are output from the access control circuit part 11. The transfer address ADR and the first, second and third serial enable signals SE0 [0:3], SE1 [0:3] and SE2 [0:3] divide the storage regions of the first through third memory blocks 8 through 10 into storage regions amounting to 2 frames, that is, the sides A and B.

FIG. 9 is a diagram for explaining the arrangement of storage regions of the frame buffer part.

The first memory block 8 is divided into storage regions A0 and A1 by the value of a most significant bit (MSB) ADR8 of the transfer address ADR. The second memory block 9 is divided into storage regions A2 and B0 by the value of the MSB ADR8 of the transfer address ADR. In addition, the third memory block 10 is divided into storage regions B1 and B2 by the value of the MSB ADR8 of the transfer address ADR.

The side A is formed by the storage regions A0 and A1 of the first memory block 8, and the storage region A2 of the second memory block 9. On the other hand, the side B is formed by the storage region B0 of the second memory block 9, and the storage regions B1 and B2 of the third memory block 10.

The transfer address ADR and the first through third serial enable signals SE0 through SE2 are generated by the access control circuit part 11 in order to divide the storage regions of the first through third memory blocks 8 through 10 into storage regions amounting to 2 frames, that is, the sides A and B.

The access control circuit part 11 includes a clock generator 12, a storage buffer 13, and a control circuit 14. The clock generator generates a pixel clock signal PCLK having a period dependent on a timing with which 1 pixel is output. The storage buffer 13 stores the AB side selection value which selects 1 of the 2 frames stored in the frame buffer part 6 for each pixel. This AB side selection value is obtained from the drawing controller 5 or the host processor 2. The control circuit 14 receives from the drawing controller 5 a vertical synchronizing signal VSYNC and a blanking signal BLK synchronized to the drawing frame, the MSB ADR8 of the transfer address ADR, an output enable signal OE, and a RAS signal supplied when reading the display data stored in the frame buffer part 6. The control circuit 14 also receives the pixel clock signal PCLK from the clock generator 12, and the AB side selection value AB[0:3] from the storage buffer 13. In response to the above described signals received, the control circuit 14 generates transfer address signals ADR8-0, ADR8-1 and ADR8-2, and serial enable signals SE0 [0:3], SE1 [0:3] and SE2 [0:3].

The transfer address signals ADR8-0, ADR8-1 and ADR8-2 are used as MSBs of transfer addresses, and the serial enable signals SE0 [0:3], SE1 [0:3] and SE2 [0:3] are used as selection signals.

Figure 10:
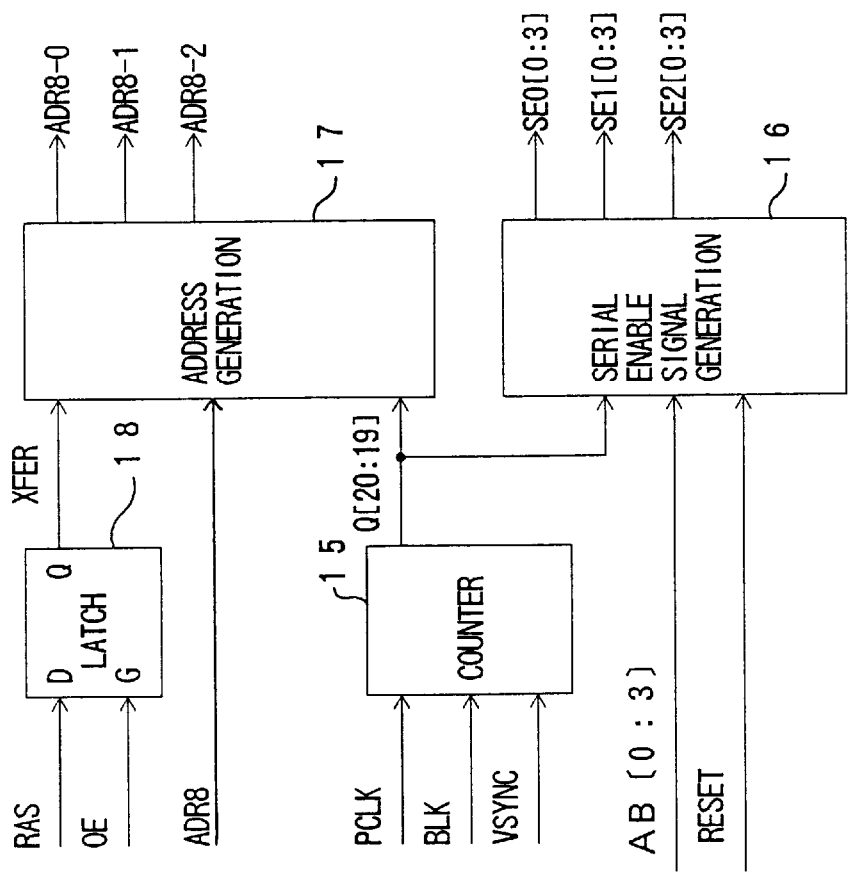
FIG. 10 is a system block diagram showing an embodiment of a control circuit.

FIG. 10 shows an embodiment of the control circuit. The control circuit 14 shown in FIG. 10 includes a displaying pixel counter 15, a serial enable signal generation circuit 16, an address generation circuit 17, and a delay latch circuit 18.

The displaying pixel counter 15 receives the pixel clock signal PCLK from the clock generator 12 and the blanking signal BLK and the vertical synchronizing signal VSYNC from the drawing controller 5. The displaying pixel counter 15 is reset in response to the vertical synchronizing signal VSYNC, and counts the pixel clock signal PCLK so as to output a counted value indicating the displaying pixel position.

The serial enable signal generation circuit 16 receives the AB side selection value from the is storage buffer 13 and the counted value from the displaying pixel counter 15, and generates the first, second and third serial enable signals SE0, SE1 and SE2.

The address generation circuit 17 receives the MSB ADR8 of the transfer address ADR from the drawing controller 5 and the counted value from the displaying pixel counter 15 indicating the output position of the present display data, and generates MSBs (transfer address signals) ADR8-0, ADR8-1 and ADR8-2 of the transfer address which are obtained by controlling the MSB ADR8 of the transfer address ADR depending on the counted value from the displaying pixel counter 15.

The delay latch circuit 18 receives the RAS signal and the output enable signal OE from the drawing controller 5, and generates a transfer timing detection signal XFER which controls the output timing of the transfer address signals ADR8-0, ADR8-1 and ADR8-2 which are generated from the address generation circuit 17 depending on the RAS signal and the output enable signal OE.

As described above, the displaying pixel counter 15 counts the pixel clock signal PCLK received from the clock generator 12, and is reset by the vertical synchronizing signal VSYNC. The pixel clock signal PCLK determines the output timing of the display data amounting to 1 pixel. On the other hand, the blanking signal BLK has a rising edge at the starting position of the frame.

Therefore, a counted value Q of the displaying pixel counter 15 indicates the number of pixels counted from the top left of the frame, and accordingly indicates the position of the displaying pixel. This counted value Q of the displaying pixel counter 15 is supplied to the serial enable signal generation circuit 16 and the address generation circuit 17, as described above.

As described above, the serial enable signal generation circuit 16 receives the counted value Q from the displaying pixel counter 15 and the AB side selection value from the storage buffer 13. In the serial enable signal generation circuit 16, a value A19 of the 19th bit of the counted value Q, a value Q20 of the 20th bit of the counted value Q from the displaying pixel counter 15, and the AB side selection value AB[0:3] from the storage buffer 13 are substituted into logic formulas which will be described later, so as to generate the first serial enable signal SE0 which is supplied to the first memory block 8, the second serial enable signal SE1 which is supplied to the second memory block 9, and the third serial enable signal SE2 which is supplied to the third memory block 10.

The first serial enable signal SE0 supplied to the first memory block 8 is generated as a 4-bit signal comprising SE0[0] through SE0[3]. The second serial enable signal SE1 supplied to the second memory block 9 is generated as a 4-bit signal comprising SE1[0] through SE1[3]. Similarly, the third serial enable signal SE2 supplied to the third memory block is generated as a 4-bit signal comprising SE2[0] through SE2[3].

The serial enable signals SE0, SE1 and SE2, that is, SE0[0] through SE0[3], SE1[0] through SE1[3] and SE2[0] through SE2[3], are generated based on the following logic formulas, where /RESET denotes an inverted signal of the reset signal supplied to the storage buffer 13, "+" denotes an OR operation, and "*" denotes an AND operation.

SE0[0]=AB[0]+Q20+/RESET
SE0[1]=AB[1]+Q20+/RESET
SE0[2]=AB[2]+Q20+/RESET
SE0[3]=AB[3]+Q20+/RESET
SE1[0]=/(AB[0]*/Q20*/Q19)*/(/AB[0]*Q20*/Q19)+/RESET
SE1[1]=/(AB[1]*/Q20*/Q19)*/(/AB[1]*Q20*/Q19)+/RESET
SE1[2]=/(AB[2]*/Q20*/Q19)*/(/AB[2]*Q20*/Q19)+/RESET
SE1[3]=/(AB[3]*/Q20*/Q19)*/(/AB[3]*Q20*/Q19)+/RESET
SE2[0]=/AB[0]+(/Q20*/Q19)+/RESET
SE2[1]=/AB[1]+(/Q20*/Q19)+/RESET
SE2[2]=/AB[2]+(/Q20*/Q19)+/RESET
SE2[3]=/AB[3]+(/Q20*/Q19)+/RESET

The serial enable signal generation circuit 16 includes logic circuits which realize the operations of the logic formulas described above.

Figure 11:
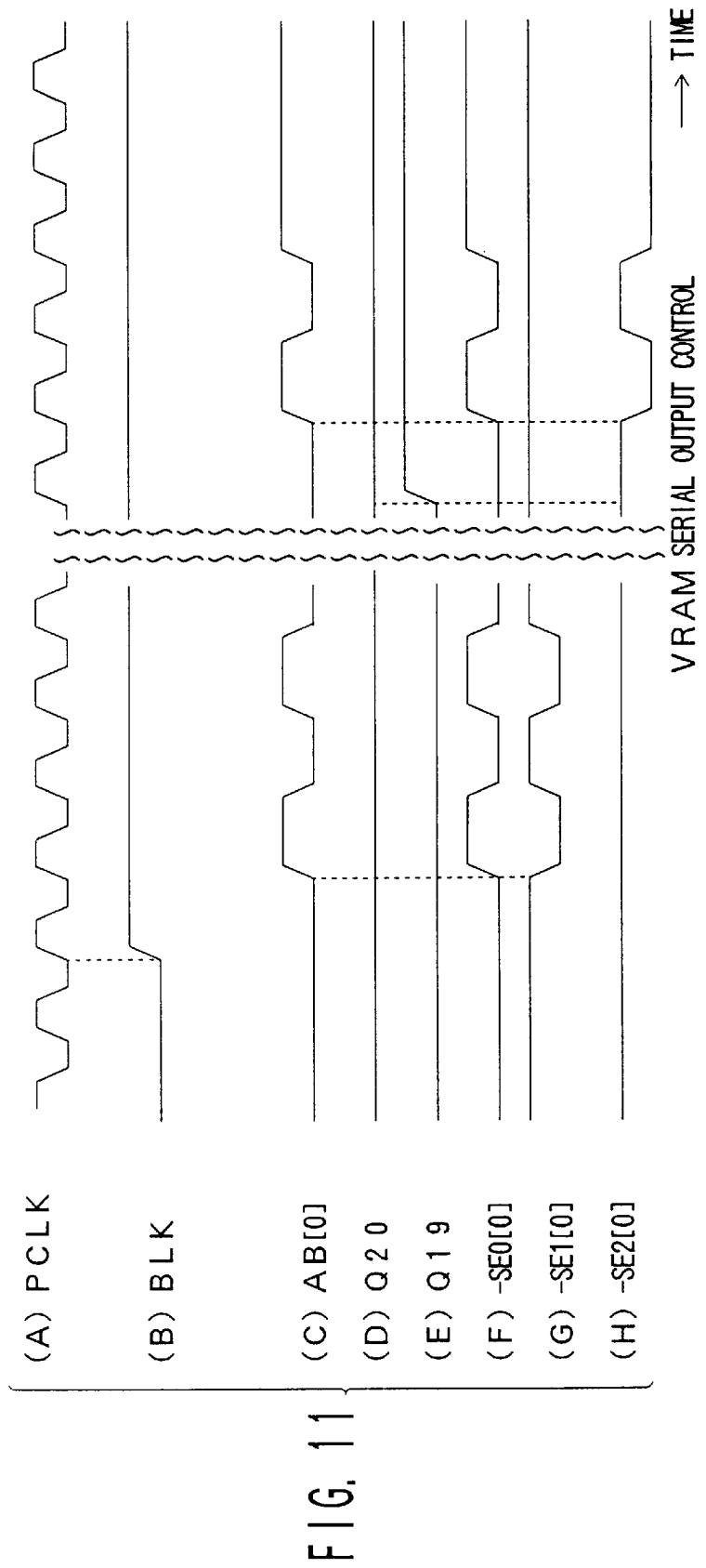
FIGS. 11(A) through 11(H) are timing charts for explaining the operation of the control circuit when generating serial enable signals.

FIGS. 11(A) through 11(H) are timing charts for explaining the operation of the access control circuit part 11 when generating the serial enable signals SE0 through SE2. FIG. 11(A) shows the pixel clock signal PCLK generated from the clock generator 12, FIG. 11(B) shows the blanking signal BLK generated from the drawing controller 5, and FIG. 11(C) shows the AB side selection value AB[0:3]. FIG. 11(D) shows the value Q20 of the 20th bit of the counted value Q of the displaying pixel counter 15, and FIG. 11(E) shows the value Q19 of the 19th bit of the counted value Q of the displaying pixel counter 15. FIG. 11(F) shows the first serial enable signal SE0[0], FIG. 11(G) shows the second serial enable signal SE1[0], and FIG. 11(H) shows the third serial enable signal SE2[0].

As may be seen from FIGS. 11(G) through 11(H), the first, second and third serial enable signals SE0[0], SE1[0] and SE2[0] are generated from the value Q20 of the 20th bit of the counted value Q of the displaying pixel counter 15 shown in FIG. 11(D) and the value Q19 of the 19th bit of the counted value Q of the displaying pixel counter 15 shown in FIG. 11(E) based on the logic formulas described above, during a high-level period of the blanking signal BLK shown in FIG. 11(B).

Figure 12:
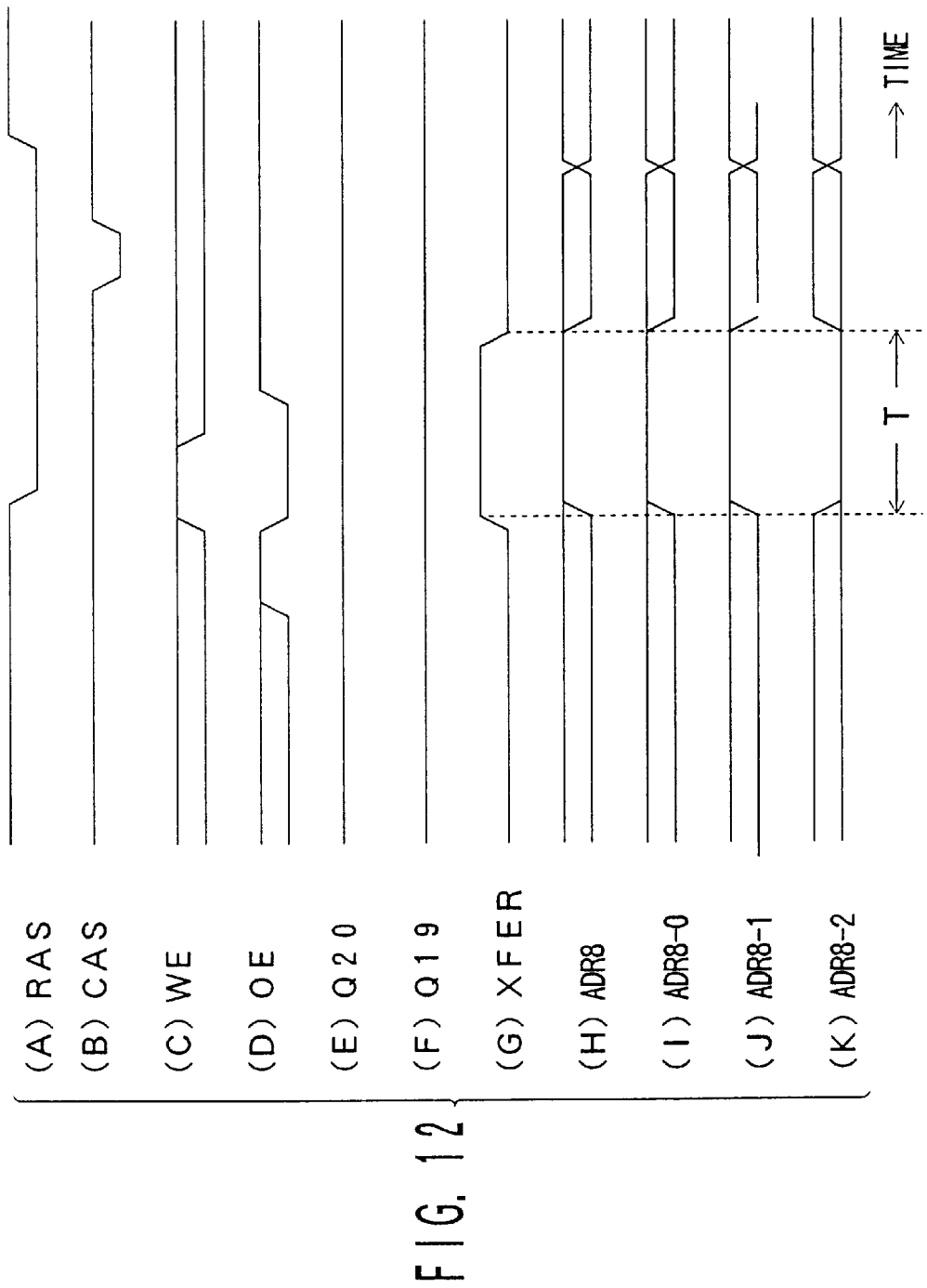
FIGS. 12(A) through 12(K) are timing charts for explaining the operation of the control circuit when generating a transfer address.

FIGS. 12(A) through 12(K) are timing charts for explaining the operation of the access control circuit part 11 when generating the transfer address ADR. FIG. 11(A) shows the RAS signal, FIG. 12(B) shows the CAS signal, FIG. 12(C) shows the write enable signal WE, and FIG. 12(D) shows the output enable signal OE. FIG. 12(E) shows the value Q20 of the 20th bit of the counted value Q of the displaying pixel counter 15, and FIG. 12(F) shows the value Q19 of the 19th bit of the counted value Q of the displaying pixel counter 15. FIG. 12(G) shows the transfer timing detection signal XFER output from the delay latch circuit 18, and FIG. 12(H) shows the MSB ADR8 of the transfer address ADR output from the drawing controller 5 and supplied to the address generation circuit 17. FIG. 12(I) shows the transfer address signal ADR8-0 generated from the address generation circuit 17 and supplied to the first memory block 8, FIG. 12(J) shows the transfer address signal ADR8-1 generated from the address generation circuit 17 and supplied to the second memory block 9, and FIG. 12(K) shows the transfer address signal ADR8-2 generated from the address generation circuit 17 and supplied to the third memory block 10.

By latching the RAS signal shown in FIG. 12(A) in response to the output enable signal OE shown in FIG. 12(D), the level of the transfer timing detection signal XFER becomes high as shown in FIG. 12(G). In this state where the transfer timing detection signal XFER has the high level, the address generation circuit 17 recognizes the transfer address ADR received from the drawing controller 5 as a general data read/write operation. Accordingly, during a time T shown in FIGS. 12(G) through 12(K), the address generation circuit 17 does not convert the MSB ADR8 of the transfer address ADR, and supplies the MSB ADR8 as it is to the first through third memory blocks 8 through 10. As a result, the general data read/write operation is made possible.

FIG. 13 is a diagram showing the relationship of the counted value Q of the displaying pixel counter and the transfer address signals ADR8-0, ADR8-1 and ADR8-2 with respect to a display region.

As shown in FIG. 13, according to the access control circuit part 11, the 20th and 19th bits of the counted value Q of the displaying pixel counter 15 have values [0, 0] when the storage regions A0 and B0 shown in FIG. 9 are displayed. In this case, the transfer address signal (MSB) ADR8-0 of the transfer address ADR0 supplied to the first memory block 8 is set to "0" and the transfer address signal (MSB) ADR8-1 of the transfer address ADR1 supplied to the second memory block 9 is set to "1", depending on the values [0, 0] of the 20th and 19th bits of the counted value Q. For this reason, when the first storage region A0 having the value "0" for the MSB ADR8 is selected in the first memory block 8 by the transfer address signal ADR8-0 having the value "0", the second storage region B0 having the value "1" for the MSB ADR8 is selected in the second memory block 9 by the transfer address signal ADR8-1 having the value "1". Therefore, it is possible to match the display positions between the sides A and B.

The 20th and 19th bits of the counted value Q of the displaying pixel counter 15 have values [0, 1] when the storage regions A1 and B1 shown in FIG. 9 are displayed. In this case, the transfer address signal (MSB) ADR8-0 of the transfer address ADR0 supplied to the first memory block 8 is set to "1" and the transfer address signal (MSB) ADR8-2 of the transfer address ADR2 supplied to the third memory block 10 is set to "0", depending on the values [0, 1] of the 20th and 19th bits of the counted value Q. For this reason, when the first storage region A1 having the value "1" for the MSB ADR8 is selected in the first memory block 8 by the transfer address signal ADR8-0 having the value "1", the third storage region B1 having the value "0" for the MSB ADR8 is selected in the third memory block 10 by the transfer address signal ADR8-2 having the value "0". Therefore, it is possible to match the display positions between the sides A and B.

In addition, the 20th and 19th bits of the counted value Q of the displaying pixel counter 15 have values [1, 0] when the storage regions A2 and B2 shown in FIG. 9 are displayed. In this case, the transfer address signal (MSB) ADR8-1 of the transfer address ADR1 supplied to the second memory block 9 is set to "0" and the transfer address signal (MSB) ADR8-2 of the transfer address ADR2 supplied to the third memory block 10 is set to "1", depending on the values [1, 0] of the 20th and 19th bits of the counted value Q. For this reason, when the first storage region A2 having the value "0" for the MSB ADR8 is selected in the second memory block 9 by the transfer address signal ADR8-1 having the value "0", the second storage region B2 having the value "1" for the MSB ADR8 is selected in the third memory block 10 by the transfer address signal ADR8-2 having the value "1". Therefore, it is possible to match the display positions between the sides A and B.

Figure 14:
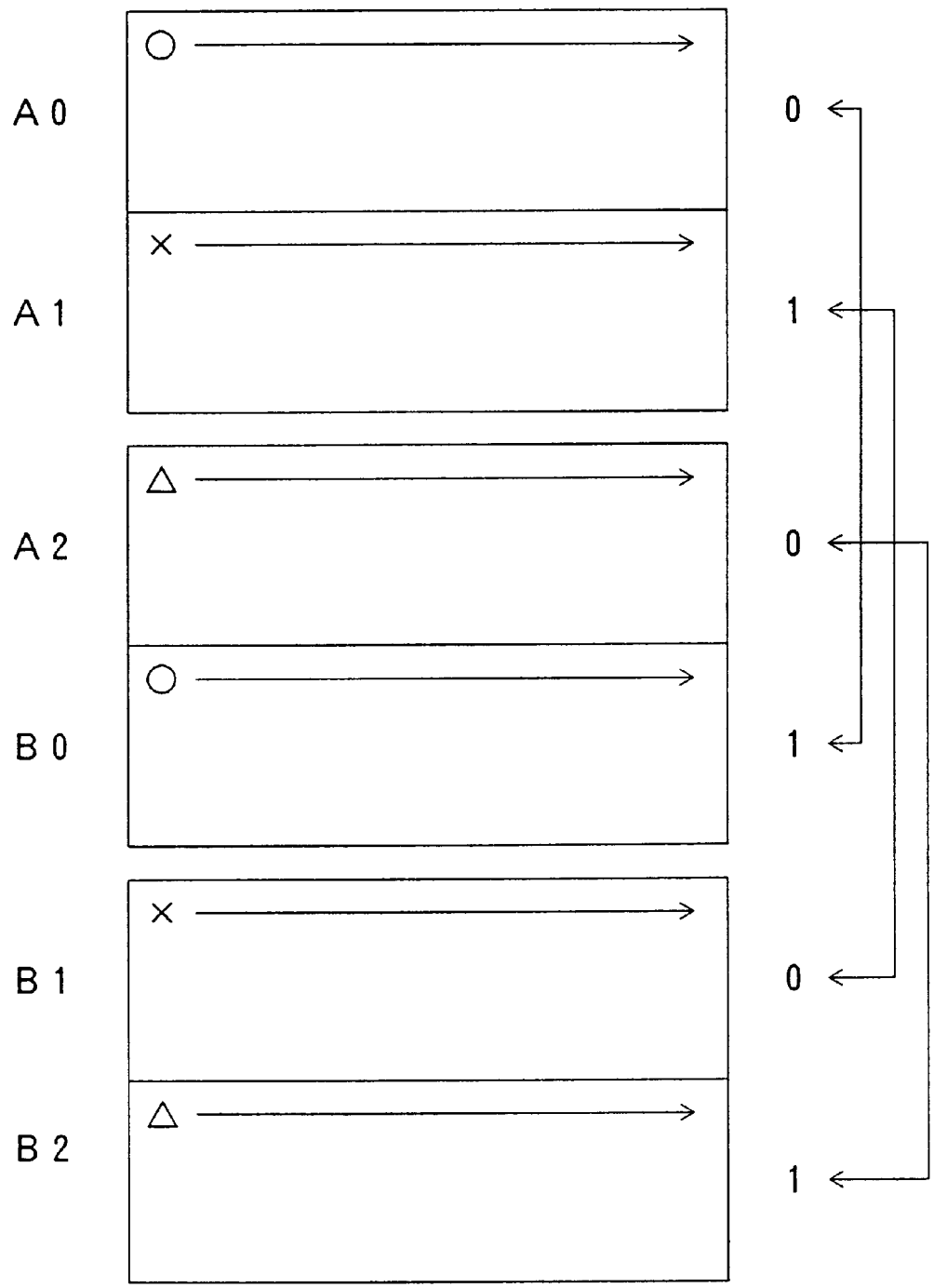
FIG. 14 is a diagram for explaining the operation of the embodiment of the image processing system.

FIG. 14 is a diagram for explaining the operation of this embodiment of the image processing system.

As described above, it is possible to match the display positions between the sides A and B, by converting the values of the transfer address signals (MSBs) ADR8-0, ADR8-1 and ADR8-2 of the transfer addresses ADR0, ADR1 and ADR2 which are respectively supplied to the first, second and third memory blocks 8, 9 and 10 in the address generation circuit 17 as shown in FIG. 13 depending on the display positions in the frame. For example, when the transfer address signal (MSB) ADR8-0 of the transfer address ADR0 supplied to the first memory block 8 is "0" and the access is made to the first position of the first memory block 8, that is, the access is made to the first display data of the side A as indicated by a circular mark in FIG. 14, the transfer address signal (MSB) ADR8-1 of the transfer address ADR1 supplied to the second memory block 9 becomes "1" and the first address of the second storage region B0 is specified to make access to the first display data of the side B. As a result, the access is made to the same position between the sides A and B.

If the AB side selection value selects the side A, the first memory block 8 is selected depending on the information related to the AB side selection value indicating the selection of the side A and the information related to the present access position, and the first display data of the side A that is presently being accessed in the first memory block 8 is output. In addition, if the AB side selection value selects the side B, the second memory block 9 is selected depending on the information related to the AB side selection value indicating the selection of the side B and the information related to the present access position, and the first display data of the side B that is presently being accessed in the second memory block 9 is output.

Furthermore, when a position indicated by a cross ("x") mark in FIG. 14 is presently being accessed, the first memory block 8 is selected depending on the information related to the AB side selection value indicating the selection of the side A and the information related to the present access position if the AB side selection value selects the side A, and the display data at the position where the MSB of the transfer address is "1" in the first memory block 8 is output. On the other hand, if the AB side selection value selects the side B, the third memory block 10 is selected depending on the information related to the AB side selection value indicating the selection of the side B and the information related to the present access position, and the first display data of the side B in the third memory block 19 is output.

In addition, when a position indicated by a triangular mark in FIG. 14 is presently being accessed, the second memory block 9 is selected depending on the information related to the AB side selection value indicating the selection of the side A and the information related to the present access position if the AB side selection value selects the side A, and the display data at the first position in the second memory block 9 is output. On the other hand, if the AB side selection value selects the side B, the third memory block 10 is selected depending on the information related to the AB side selection value indicating the selection of the side B and the information related to the present access position, and the display data at the position where the MSB of the transfer address is "1" in the third memory block 10 is output.

Accordingly, even if the output display data of the frame buffer part 6 is switched between the sides A and B depending on the AB side selection value, the display data at the same position is output from either the side A or the side B. For this reason, it is possible to synchronize the display between the sides A and B, and a normal display is possible as in the conventional case described above where a frame buffer part having a considerably larger memory capacity is used to store the display data.

According to this embodiment, the second memory block 9 can be used in common between the side A and the side B. Hence, by setting the memory capacity of each memory block to ⅔ that corresponding to 1 frame, it is possible to divide the second memory block 9 into 2 storage regions respectively for the side A and the side B. Thus, it is possible to accurately distribute the display data among the memory blocks between the side A and the side B, thereby minimizing the total memory capacity of the frame buffer part 6.

If 2 frames are formed using 2 memory blocks as in the conventional case, the memory capacity may be wasted when the memory capacity of the available VRAM is not appropriate with respect to the memory capacity required to store 2 frames of the display data. However, this embodiment reduces the memory capacity of each memory block in such a case, so that 1 of the 3 memory blocks can be used in common between 2 frames. As a result, this embodiment can realize a double buffer structure using a minimum required memory capacity with respect to the memory capacity required to store 2 frames of the display data.

In addition, this embodiment simply requires the access control circuit part 11 to be connected between the drawing controller 5 and the frame buffer part 6, and the advantageous effects of the present invention can be obtained without the need to greatly modify the construction of the image processing system.

In this embodiment, the drawing controller 5 is made up of a known 1-chip drawing controller LSI and the access control circuit part 11 is provided independently of the 1-chip drawing controller LSI. However, it is of course possible to include the functions of the access control circuit part 11 in the drawing controller 5.

Figure 15:
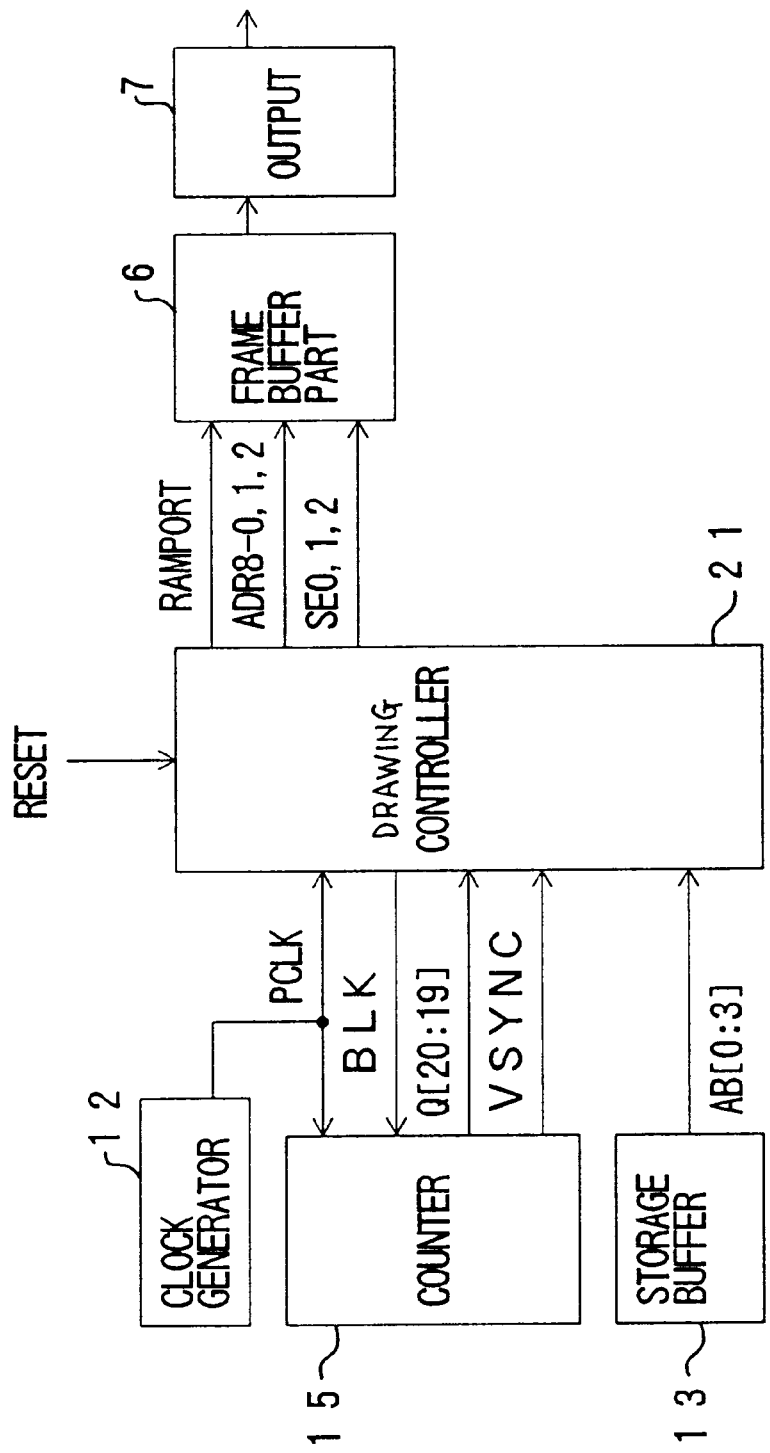
FIG. 15 is a system block diagram showing a modification of the embodiment of the access control apparatus.

Next, a description will be given of a modification of the embodiment of the access control apparatus described above, by referring to FIG. 15. FIG. 15 shows this modification of the embodiment. In FIG. 15, those parts which are the same as those corresponding parts in FIG. 7 are designated by the same reference numerals, and a description thereof will be omitted.

In this modification, a drawing controller 21 shown in FIG. 15 is made up of a 1-chip LSI including the serial enable signal generation circuit 16, the address generation circuit 17 and the delay latch circuit 18 shown in FIG. 10 and the drawing controller 5 shown in FIG. 7.

As is evident from the description given above, the access control apparatus according to the present invention is also applicable to image processing systems such as a graphics accelerator.

Further, the present invention is not limited to these embodiments, but various variations and modifications may be made without departing from the scope of the present invention.

What is claimed is:

1. An access control apparatus which controls access to a frame buffer part including first, second and third memory blocks storing image data, said access control apparatus comprising:

a storage buffer storing a selection value which selectively indicates one of first and second parts of image data, each part amounting to one frame of image data, to be stored in tie frame buffer part; and an access control circuit part generating control signals in response to the selection value read from said storage buffer, said control signals specifying the first memory block and a first half of the second memory block when the selection value indicates the first part of image data, and specifying a second half of the second memory block and the third memory block when the selection value indicates the second part of image data, so that a double buffer structure is formed by the first through third memory blocks.

2. The access control apparatus as claimed in claim 1, wherein said frame buffer part includes video random access memories having random access memory ports and serial access memory ports, and the control signals generated from said access control circuit part include addresses of the random access memory ports and output enable signals with respect to the serial ports of the video random access memories.

3. The access control apparatus as claimed in claim 1, wherein each of the first through third memory blocks have a memory capacity amounting to two-thirds of a memory capacity required-to store image data amounting to one frame.

4. An image processing system comprising:

a frame buffer part including first, second and third memory blocks storing image data;

a storage buffer storing a selection value which selectively indicates one of first and second parts of image data, each part amounting to one frame of image data, to be stored in said frame buffer part; and said control signals specifying the first memory block and a first half of the second memory block when the selection value indicates the first part of image data, and specifying a second half of the second memory block and the third memory block when the selection value indicates the second part of image data, so that a double buffer structure is formed by the first through third memory blocks.

5. The image processing system as claimed in claim 4, wherein said frame buffer part includes video random access memories having random access memory ports and serial access memory ports, and the control signals generated from said access control circuit part include addresses of the random access memory ports and output enable signals with respect to the serial ports of the video random access memory ports and output enable signals with respect to the serial ports of the video random access memories.

6. The image processing system as claimed in claim 4, wherein each of the first through third memory blocks have a memory capacity amounting to two-thirds of a memory capacity required to store image data amounting to one frame.

7. An image processing system comprising:

first storage means, having a first storage region and a second storage region divided depending on a transfer address, and selected in response to a selection signal, for outputting image data from a storage position dependent on the transfer address;

second storage means, having a third storage region and a fourth storage region divided depending on a transfer address, and selected in response to a selection signal, for outputting image data from a storage position dependent on the transfer address;

third storage means, having a fifth storage region and a sixth storage region divided depending on a transfer address, and selected in response to a selection signal, for outputting image data from a storage position dependent on the transfer address; and control means for controlling the transfer addresses supplied to said first, second and third storage means so that each pair of storage regions formed by the first and fourth storage regions, the second and fifth storage regions, and the third and sixth storage regions are accessed simultaneously, and for controlling the selection signals so that one of first and second region groups are selected, said first region group including the first, second and third storage regions, said second region group including the fourth, fifth and sixth storage regions.

8. The image processing system as claimed in claim 7, wherein said control means comprises:

displaying pixel detection means for detecting a position of image data to be displayed; and address generation means for generating the transfer addresses which are supplied to said first through third storage means by judging a region which is to output the display data among the first through sixth storage regions depending on the position detected by said displaying pixel detection means.

9. The image processing system as claimed in claim 8, wherein said control means judges whether or not an access to output the image data from said first through third storage means exists depending on access control signals, and supplies the access control signals and the transfer addresses to said first through third storage means if the access to output the image data exists.

10. The image processing system as claimed in claim 7, wherein said control means comprises:

detection means for detecting a position of image data to be output; and selection signal generation means for generating the selection signals which are supplied to said first through third storage means depending on a signal specifying one of the first and second region groups.

11. The image processing system as claimed in claim 7, wherein said control means judges whether or not an access to output the image data from said first through third storage means exists depending on access control signals, and supplies the access control signals and the transfer addresses to said first through third storage means if the access to output the image data exists.

12. The image processing system as claimed in claim 10, wherein said control means judges whether or not an access to output the image data from said first through third storage means exists depending on access control signals, and supplies the access control signals and the transfer addresses to said first through third storage means if the access to output the image data exists.

\* \* \* \* \*

UNITED STATES PATENT AND TRADEMARK OFFICE
CERTIFICATE OF CORRECTION

PATENT NO. : 5,929,871
DATED : July 27, 1999
INVENTOR(S) : Masatoshi KOMEICHI

It is certified that error appears in the above-identified patent and that said Letters Patent is hereby corrected as shown below:

Col. 15, line 4, change "required-to" to --required to--.

Signed and Sealed this

Twenty-first Day of December, 1999

Attest:

Q. TODD DICKINSON

*Attesting Officer*      *Acting Commissioner of Patents and Trademarks*